(12) United States Patent
Drissi et al.

(10) Patent No.: US 8,572,560 B2
(45) Date of Patent: Oct. 29, 2013

(54) COLLABORATIVE SOFTWARE DEVELOPMENT SYSTEMS AND METHODS PROVIDING AUTOMATED PROGRAMMING ASSISTANCE

(75) Inventors: Youssef Drissi, Ossining, NY (US); Daby M. Sow, North White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 2064 days.

(21) Appl. No.: 11/329,339

(22) Filed: Jan. 10, 2006

(65) Prior Publication Data
US 2007/0168946 A1 Jul. 19, 2007

(51) Int. Cl.
*G06F 9/44* (2006.01)

(52) U.S. Cl.
USPC ............ 717/120; 717/121; 717/122; 717/126

(58) Field of Classification Search
USPC .......... 717/101, 120, 121, 122, 126; 707/3, 4, 707/5, 6, 101, 102, 204
See application file for complete search history.

(56) References Cited

U.S. PATENT DOCUMENTS

| 4,751,635 | A * | 6/1988 | Kret ................................ 707/10 |
| 5,845,119 | A * | 12/1998 | Kozuka et al. ................ 717/107 |
| 2003/0220912 | A1* | 11/2003 | Fain et al. ......................... 707/3 |
| 2004/0015377 | A1* | 1/2004 | Hostetler .......................... 705/7 |
| 2004/0040014 | A1* | 2/2004 | Ball .............................. 717/130 |
| 2004/0204972 | A1* | 10/2004 | Anant et al. ...................... 705/7 |
| 2004/0230964 | A1* | 11/2004 | Waugh et al. ................. 717/168 |
| 2005/0120333 | A1* | 6/2005 | Inoue et al. ................... 717/120 |

OTHER PUBLICATIONS

Freeman et al., "Classifying Software for Reusability," Jan. 1987. IEEE. vol. 4 Issue 1, pp. 6-16.*
Asklund et al. A Study of Configuration Management in Open Source Software Projects. IEE Proceedings, vol. 149, Issue 1 [online] (Feb. 2002). IEEE, pp. 40-49. Retrieved From the Internet <http://ieeexplore.ieee.org/iel5/5658/21556/00999089.pdf?tp=&arnumber=999089&isnumber=21556>.*
Meling et al. Storing and Retrieving Software Components: A Component Description Manager. [online] (Aug. 6, 2002). IEEE, Proceedings of the Software Engineering Conference 2000 pp. 107-117. Retrieved From the Internet <http://ieeexplore.ieee.org/xpls/abs_all.jsp?arnumber=844568&tag=1>.*

* cited by examiner

*Primary Examiner* — Emerson Puente
*Assistant Examiner* — Jonathan R Labud
(74) *Attorney, Agent, or Firm* — F. Chau & Associates, LLC; Anne V. Dougherty, Esq.

(57) ABSTRACT

Collaborative program development systems are provided which implement methods for providing automated programming assistance to code developers in a collaborative program development environment. In particular, systems and methods for automated programming assistance are supported by leveraging a database or library of shared code snippets that are classified according to code patterns and rating scores that are derived from feedback and input from various code developers within a collaborative program development environment.

32 Claims, 5 Drawing Sheets

FIG. 5

COLLABORATIVE SOFTWARE DEVELOPMENT SYSTEMS AND METHODS PROVIDING AUTOMATED PROGRAMMING ASSISTANCE

TECHNICAL FIELD OF THE INVENTION

The present invention relates generally to systems and methods for implementing multi-user collaborative software development environments and, in particular, integrated software development systems and methods for sharing source code patterns and providing automated programming assistance.

BACKGROUND

In general, Integrated Development Environments (IDEs) are powerful programming toolkits that integrate editors, wizards, compilers, debuggers, and other tools, which enable software developers to build complex programs and applications. Typically, conventional IDE systems and programming toolkits employs functions and other resources to provide assistance to developers in designing and implementing application code.

These conventional systems, however, lack automated programming assistance methods that can assist program developers to address and solve complex coding problems. For instance, when using an unfamiliar library, a code developer can not receive automated guidance from a conventional IDE system for best coding practices to optimize use of the library. In particular, conventional IDE systems do not provide automated programming assistance by offering guidance or suggestions to enhance the quality of code that is written by a developer or ensure that the developer's code is compliant with existing coding guidelines imposed by an organization.

SUMMARY OF THE INVENTION

Exemplary embodiments of the invention generally include multi-user collaborative software development environments that provide automated programming assistance to code developers More specifically, exemplary embodiments of the invention include systems and methods for providing automated programming assistance to code developers in a collaborative IDE system by leveraging a database or library of shared code snippets that are classified according to code patterns and rating scores that are derived from feedback and input from various code developers within a community of code developers.

More specifically, in one exemplary embodiment of the invention, automated programming assistance is supported by maintaining a code repository of code snippets that are authored by one or more developers in a collaborative program development environment. Quality scores are associated to the code snippets in the code repository. The code snippet quality scores are derived from information provided by one or more of the developers. The code snippets and associated quality scores are utilized to provide automated programming assistance upon request from one or more code developers in the collaborative community of developers. In one embodiment, the quality score of a given code snippet is derived from user profile information associated with developers who authored the given code snippet. In another embodiment, the quality score of a given code snippet is derived, in part, from feedback rating information provided by one or more of the developers.

In another exemplary embodiment, an automated programming assistance method includes processing program code input by the developer to identify a code pattern in the input program code, and then searching the code repository for a code snippet having a code pattern that is similar to an identified code pattern of the input program code. In one embodiment, the input code is processed by using one or more predetermined code pattern templates to identify a code pattern in the input program code that matches to a code pattern template.

In another embodiment, a quality score is assigned to an identified code pattern of the input program code, and a search is performed to find a code snippet in the code repository which is similar to the identified code pattern and which has a quality score that is higher than the quality score assigned to the identified code pattern.

In another exemplary embodiment of the invention, a method for supporting multi-user collaborative program development includes obtaining a code snippet that is authored by one or more developers in a collaborative program development environment, automatically classifying the code snippet, and then storing the classified code snippet in the code repository. In one embodiment of the invention, code snippets to be stored in the code repository are classified in at least one of a plurality of predefined classes, wherein the plurality of predefined classes include a code pattern type class and a quality score class. The classified code snippets in the code repository are utilized to provide automated programming assistance upon request from one or more code developers in the collaborative community of developers.

In one exemplary embodiment, a code snippet is automatically classified by determining a code pattern of the code snippet, and determining a quality score of the code snippet, wherein the code snippet is classified according to the code pattern and quality score of the code snippet. A code pattern is determined by comparing the code snippet to each of a plurality of code pattern templates, wherein the code snippet is classified based on a class associated with a matching code pattern template. The quality score of the code snippet is determined, at least in part, by a quantitative measure of a level of experience and skill of the developer who authored the code snippet, as derived from user profile information that is maintained for the developer. More specifically, in one exemplary embodiment, the user profile information of a given developer is used to determine a user score associated with the developer. The user score is a quantitative measure of a level of skill and experience of the developer. The quality scores of code snippets are based on user scores of developers who authored the code snippets.

In another exemplary embodiment of the invention, a code snippet in the code repository can be reclassified based on feedback received by a developer. The feedback may be some quantitative quality rating of a code snippet as perceived by a developer after using the code snippet. For instance, the feedback from the developer be an increase or decrease of the quality score of the code snippet used by the developer. The amount of increase or decrease of the quality score by the developer can be limited to some predetermined change threshold.

In another embodiment of the invention, constraints may be placed on the use of feedback from a developer to reclassify a code snippet by the enforcement of one or more conditions for accepting such feedback. For instance, one condition is that a developer can not provide feedback regarding a code snippet authored by the developer. Another condition is that a developer can not provide feedback for a given code snippet more than a predetermined number of times. Another condition is that feedback from a developer must be approved by one or more other developers in the collaborative program development environment.

In other exemplary embodiment, the feedback may be in the form of quantitative measure of the experience and skill rating of a code developer who authored the code snippet, as perceived by another code developer. In this manner, the user score of a developer can be increased or decreased based on such feedback received by one or more other developers.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Exemplary systems and methods for supporting multi-user collaborative software development environments will now be discussed in greater detail with reference to the exemplary Figures in which the same reference numbers denote the same or similar elements. It is to be understood that the systems and methods described herein in accordance with the present invention may be implemented in various forms of hardware, software, firmware, special purpose processors, or a combination thereof. In particular, in one exemplary embodiment, systems and methods of the invention are implemented in software comprising program instructions that are tangibly embodied on one or more program storage devices (e.g., hard disk, magnetic floppy disk, RAM, CD ROM, DVD, ROM and flash memory), and executable by any device or machine comprising suitable architecture.

It is to be further understood that because the constituent system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
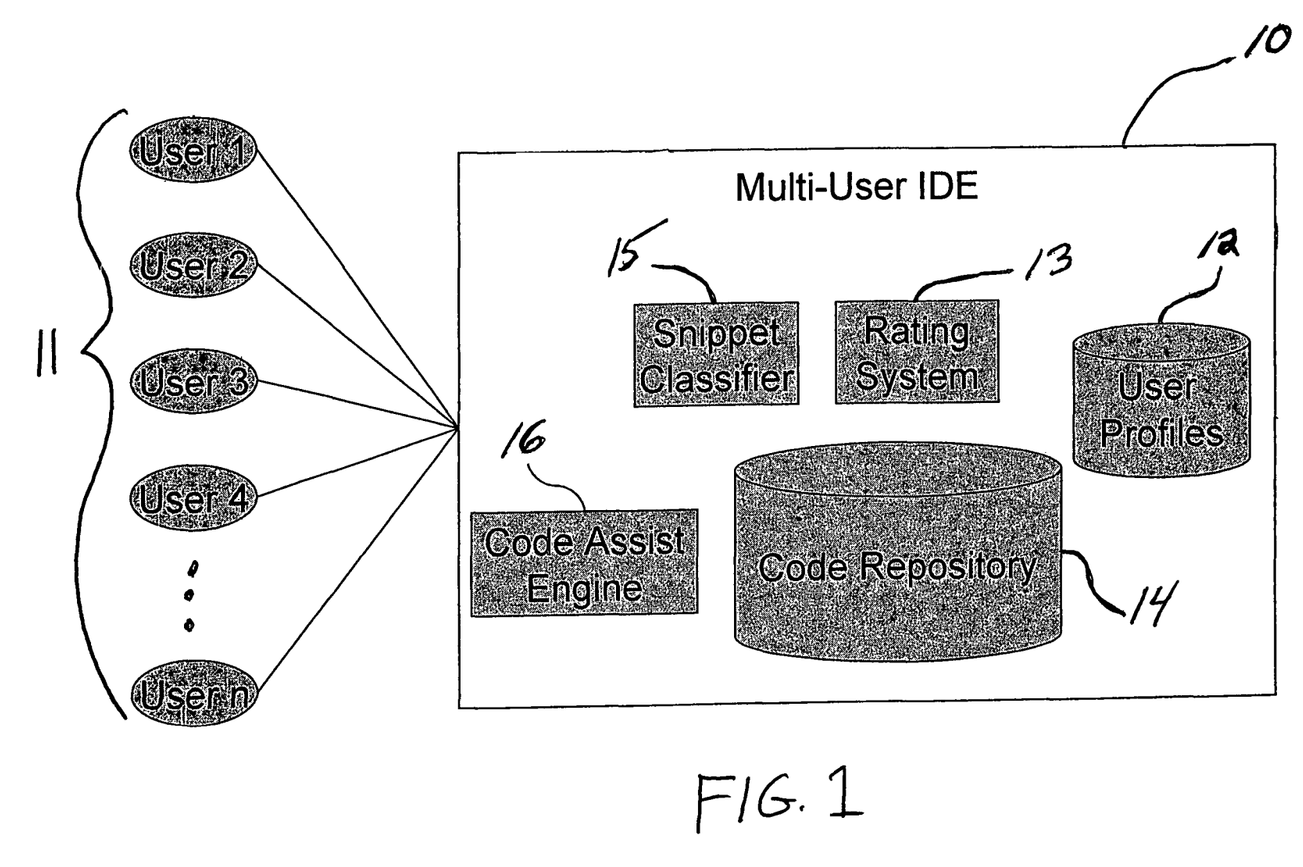
FIG. 1 illustrates a collaborative program development system according to an exemplary embodiment of the invention.

FIG. 1 illustrates a collaborative software development system according to an exemplary embodiment of the invention. In general, FIG. 1 illustrates a multi-user IDE system (10) that implements various functional modules to provide automated programming assistance to a community of subscribing users (11) (or code developers/authors). The system (10) comprises a user profile repository (12), a code rating system (13), a code repository (14), a code classification system (15), and a programming assistance engine (16). The system modules (12~16) implement various methods for collecting, analyzing, classifying, rating, and providing shared access to persistently stored fragments/patterns of source code, to provide support for automated programming assistance.

In general, the user profile repository (12) persistently stores various types of user information for each registered user (11) within the community of code developers, including name, contact information, years of experience and skill level, etc. The user profile information is utilized to assign (automatically or by a system administrator) a user score $N_P$, to each subscribing user (11). In general, a user score $N_P$ for a given user is a quantified measure that reflects the skill and experience level of the user, which can be derived using any suitable metric. For example, a user score for a given user may be determined as $N_P = C_1 \bullet S_L + C_2 \bullet E_L$, wherein $S_L$ and $E_L$ denote the skill level and experience level, respectively, of the user, and wherein $C_1$ and $C_2$ are arbitrary constants which influence the weights of $S_L$ and $E_L$ (e.g., $C_1 = C_2 = 0.5$). The values of $S_L$ and $E_L$ can be derived directly or indirectly from user information that is input by a user (11) when registering with the system (10). For example, $S_L$ and $E_L$ may be numerical values that fall within a range of values bound by arbitrary minimum and maximum values (as decided by the system administrators). For instance $S_L$ and $E_L$ may be values in the range: 0, 1, 2, . . . , 100, which can be input by a user or set by a system administrator.

The code repository (14) stores a plurality of code snippets shared by the community of users (11). In general, the code snippets include various types of reusable segments, fragments or patterns of source code that can be used as building blocks for program development in a collaborative environment. The code repository (14) is populated with code snippets that are authored and provided by one or more of users (11) and/or code snippets that are automatically extracted from source code that is authored by one or more users (11).

The classification system (15) implements methods for automatically classifying/categorizing code snippets to be stored in the repository (14). In one exemplary embodiment of the invention, code snippets are classified/categorized according to their code pattern (type/function). For example, the classification system (15) can implement methods for comparing code snippets against a corpus of predefined code pattern templates and classifying the code snippets based on pattern similarity to the code pattern templates. Moreover, in another exemplary embodiment of the invention, code snippets are further classified based on quality scores or rating assigned to the code snippets. For example, as explained below, in one exemplary embodiment of the invention, a given code snippet can be initially scored based on the current user score(s) of one or more authors (code developers) of the code snippet, and this initial score can be used to classify the code snippet for storage in the code repository (14). Exemplary modes of operation of the classification system (15) will be discussed below with reference to FIG. 3.

The classified code snippets are stored and maintained/organized in the repository (14) according to their classification using any suitable data structure. For example, in one exemplary embodiment as discussed below with reference to FIG. 2, code snippets are clustered or otherwise grouped into a multi-level class hierarchy, wherein code snippets are classified/categorized according to their cod pattern (type/function) and quality score or rating, and stored in a hierarchical tree structure based on their classification.

The rating system (13) implements methods for assigning code scores and user scores to code snippets and users (11), respectively. More specifically, by way of example, the rating system (13) includes methods for determining and assigning initial user scores to subscribing users (11) based on user profile information, as well determining and assigning initial code scores for classifying newly authored code snippets based on the user scores of the code authors. In addition, the rating system (13) implements methods for receiving feedback from one or more users (11) regarding the quality of one or more classified code snippets in the code repository (14), which are actually used by one or more of the users (11). For example, the users (11) can interact with the rating system (13) to submit feedback by increasing or decreasing currently assigned code score(s) of the code snippet(s) used by the user (11) depending on the user's perceived quality of the code, for example.

In another exemplary embodiment of the invention, the users (11) can interact with the rating system (13) to submit feedback by increasing or decreasing currently assigned user score(s) of other code developer(s) depending on the users' opinion of the experience level and skill of the other code developers. In one exemplary embodiment of the invention, the ability of users' to modify/update the code scores and user scores can be limited by enforcing one or more constraints on the user of such feedback information, as will be explained below. Exemplary modes of operation of the rating system (13) will be discussed below with reference to FIG. 4.

In short, the rating system (13) utilizes user feedback together with user profiles (12) to derive and assign code scores to the code snippets. The code classification system (15) uses the scores generated by the rating system (13) to organize the code snippets and store such code snippets in the code repository (14). As code scores and user scores are updated over time, the code snippets in the code repository (14) can be reclassified accordingly.

The programming assistance engine (16) includes methods for providing automated programming assistance to the community of users (11) by utilizing the classified code snippets in the code repository (14). More specifically, the programming assistance engine (106) leverages the scored code snippets stored in the code repository (104) to return appropriate code snippets in response to the user query. Exemplary modes of operation of the programming assistance engine (16) will be discussed below with reference to FIG. 5.

It is to be understood that the system (10) depicted in FIG. 1 can be implemented using various system architectures. For instance, in one exemplary embodiment, the system (10) may be an integrated system that executes on a single node of a distributed computing network (e.g., local area network, wide area network, etc.). In another embodiment, one or more of the constituent components of the system (10) may be distributed and reside on different nodes of the network. For instance, the classified code patterns can stored in various code repositories distributed over the network, with a common index maintained by the system (10) to access the code snippets. For instance, the classified code snippets for each user (11) can be locally stored on the users' computing system in a local repository that is effectively shared by all users (11).

Figure 2:
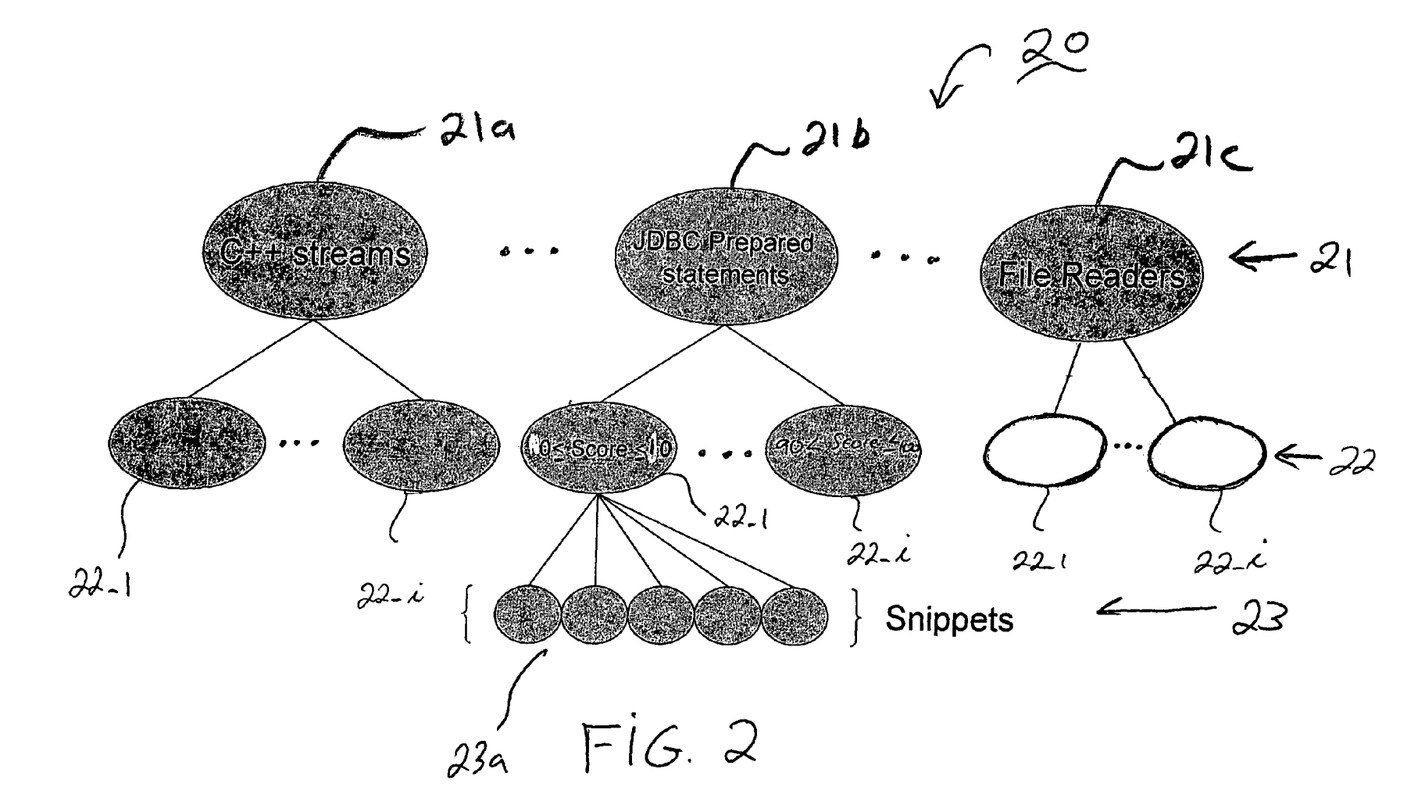
FIG. 2 illustrates a hierarchical tree structure for organizing reusable code snippets in a code repository, according to an exemplary embodiment of the invention.

As noted above, the code repository (14) stores a plurality of reusable code snippets which are classified by the code classification system (15). FIG. 2 illustrates an exemplary data structure for maintaining/organizing code snippets in the code repository (14), according to an exemplary embodiment of the invention. In particular, FIG. 2 depicts a tree structure (20) organized in a 2-level class hierarchy. The tree structure (20) comprises a plurality of level-1 nodes (21), level-2 nodes (22) and leaf nodes (23). In general, the level-1 nodes (21) represent different classes of code snippets having similar patterns, the level-2 nodes (22) represent different classes of level-1 classified codes snippets having the same or similar scores, and the level-3 nodes (23) are leaves of the tree (20) representing the classified code snippets persistently stored in the code repository (14).

More specifically, in the exemplary embodiment of FIG. 2, the level-1 nodes (21) are root nodes that represent different domains/categories of program code snippets, which are classified based on the programming language of the code snippets as well as the function/purpose of the code snippets. In other words, each level-1 class (node) (21) represents code snippets having similar code patterns. For instance, as depicted in FIG. 2, the level-1 nodes (21) include, e.g., a node (21a) that represents a class of similar C++ streams objects for reading/writing data from/to sockets, a node (21b) that represents a class of similar JDBC PreparedStatement objects for accessing a database, and a node (21c) that represents a class of file reader objects for accessing files (e.g., PDF files) within a given computing environment.

As further depicted in the exemplary embodiment of FIG. 2, the level-1 nodes (21) are divided into level-2 nodes (22), wherein each level-2 node represents code snippets (within the corresponding level-1 class) having the same or similar scores. In particular, each level-1 class (21) is divided into a group of level-2 nodes ($22\_1$~$22\_i$). In one exemplary embodiment, each level-2 node ($22\_1$~$22\_i$) within a corresponding group can represent a different one of allowable/predefined score values. In particular, assuming the range of allowable score values is 0 through 100, each level-1 node (21) will have 101 level-2 nodes ($22\_1$~$22\_i$).

In another exemplary embodiment, each level-2 node ($22\_1$~$22\_i$) within a corresponding group can represent a different range of allowable/predefined score values. By way of example, there may be 10 level-2 nodes (i.e., $22\_1$~$22\_10$), each node representing a range of at least 10 scores over an allowable range of scores from 1 to 100. In particular, as shown in FIG. 2, a level-2 node (22-1) represents a range of scores $0 \leq Score \leq 10$, and level-2 node ($22\_i$) represents a range of scores $90 < Score \leq 100$, etc. It is to be understood that the range of scores is merely exemplary and that other ranges can be considered. For instance, each level-1 class can be divided into three level-2 classes (or groups G1, G2, and G3), wherein elements of G1 have scores in the range of 0 to 30, wherein the elements of G2 have scores in the range of 31 to 59, and wherein the elements of G3 have scores in the range of 60 to 100.

As noted above, the leaves (23) of the tree (20) represent the actual code snippets, wherein each set of leaves for a given level-2 node (22) represents code snippets having similar code patterns and the same or similar scores. For instance, as depicted in FIG. 2, the set of leaf nodes (23a) include JDBC PreparedStatement objects which have similar code patterns (as per level-1 classification) and which have a score values in a range between and including 0 to 10 (as per the level-2 classification).

It is to be understood that tree structure (20) depicted in FIG. 2 is merely exemplary, and a tree structure for organizing code snippets can have any taxonomic hierarchy framework using more than 2 classes, to thereby further refine the classification of code snippets using multiple categories and/or subcategories to achieve a desired granularity of categories for a given application.

Furthermore, the tree structure can be static or evolve over time. In particular, in one exemplary embodiment of the invention, the classes and taxonomic hierarchy of the tree structure are predefined for a given environment, and do not evolve over time with use of the system. In such case, the classes remain constant, and the code repository is populated with code snippets that are classified according to the initial, predefined classes.

In other exemplary embodiments of the invention, the classes and taxonomic hierarchy of the tree structure may evolve and dynamically adapt over time based on user-specified classes and/or classes that are automatically learned. For example, the system (10) of FIG. 1 may implement machine learning methods that enable the classification system (15) to incrementally construct and develop a tree structure over time to thereby improve and optimize classification of code snippet. In one exemplary embodiment of the invention, categorization rules can evolve over time as new classes are added, old classes are removed, individual classes are combined and renamed, or as the granularity of the tree structure model (20) is otherwise refined as new classes are automatically learned or specified by the end users, etc.

Figure 3:
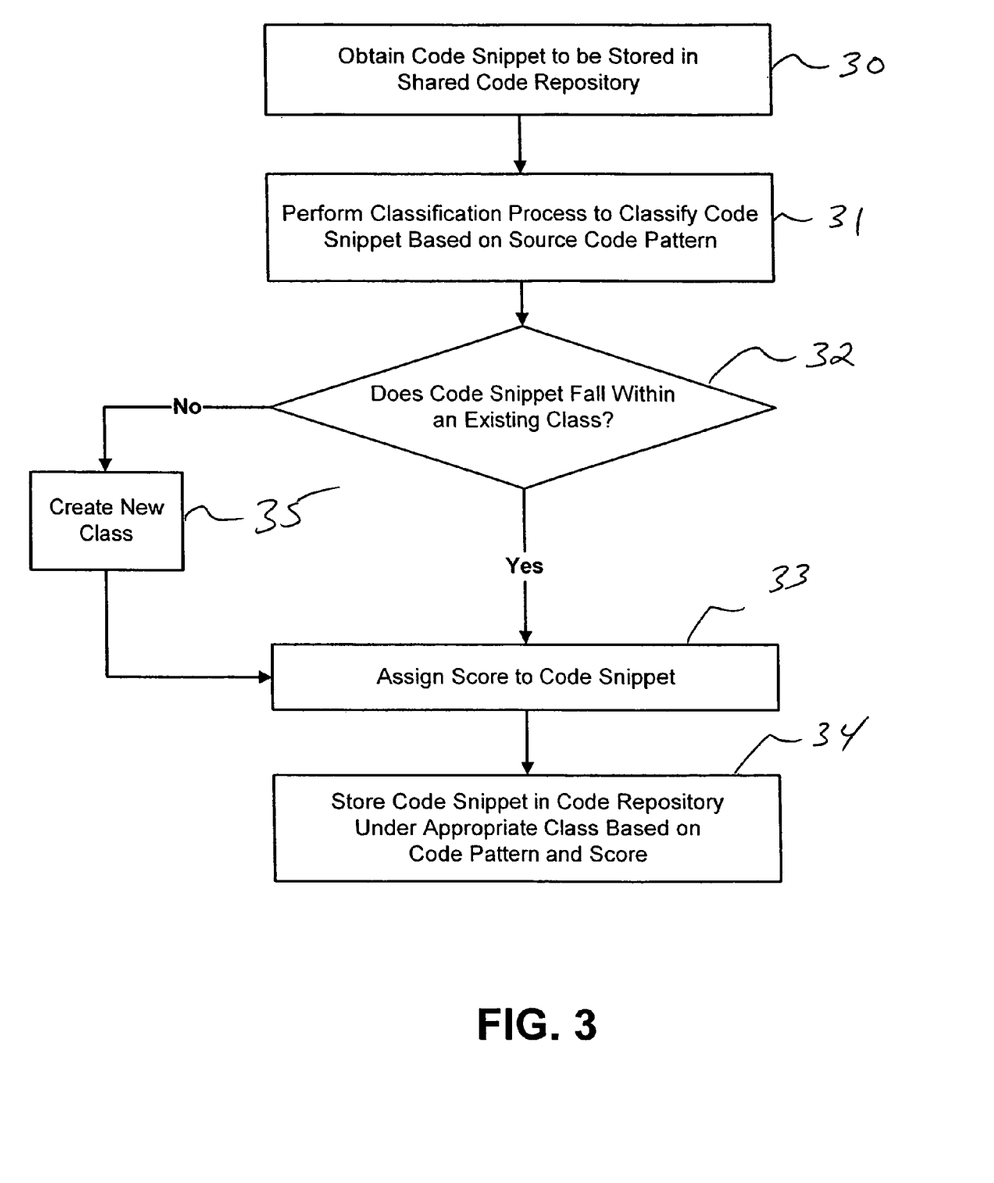
FIG. 3 illustrates a method for classifying code snippets for storage in a code repository according to an exemplary embodiment of the invention.

FIG. 3 is a flow diagram that illustrates a method for classifying code snippets according to an exemplary embodiment of the invention. In one exemplary embodiment of the invention, FIG. 3 illustrates an exemplary mode of operation of the classification system (15) (FIG. 1). Referring to FIG. 3, initially, the classification system (15) will obtain one or more code snippets to be classified and stored in the code repository (14) (step 30).

In one exemplary embodiment of the invention, the classification system can receive actual code snippets that are developed by a given user and directly input to the system by the user. In another embodiment, the classification system can implement known text pattern identification methods to automatically extract code snippets from source code of a given user which is either input from the given user or accessed from a remote repository. For example, text pattern discovery techniques can be applied to the source code to find instances of code patterns that match predefined code pattern/templates based on some similarity measure. An instance of a code pattern is actual code source that matches the code pattern. In this process, the system can recognize the programming language in which the code snippet is written by detecting language-specific reserved words and syntactic structure.

A classification process is then performed to automatically classify the code snippets based on their source code patterns (step 31). In particular, an exemplary classification process includes comparing the code snippet pattern against the predefined set of code patterns/templates (or code pattern models) to find a similar code pattern. This process can be performed using the same text identification methods for extracting code snippets from source code, as discussed above. In one exemplary embodiment of the invention, the set of predefined code patterns/templates include one or more code patterns corresponding to (representative of) each of the level-1 classes (nodes) (21) of the data structure (20). In this regard, the new code snippet can be classified based on the level-1 class associated with a matching code pattern template or model.

If the new code snippet is determined to fall within an existing class (affirmative determination in step 32), an initial code score will be assigned to the code snippet (step 33). In the exemplary code repository tree structure of FIG. 2, the initial code score assigned to the code snippet will determine the level-2 classification of the new code snippet. In one exemplary embodiment, the initial code score is set as a current user score of the author of the code snippet, as maintained in the user profile repository (12). In another exemplary embodiment, when a new code snippet is co-authored by two or more users, the initial code score can be set as an average of current user scores, or a greatest user score, of said co-authors, for example. Other methods for determining an initial code score may be implemented.

Once the new code snippet is appropriately classified based on its code pattern and score, the code snippet is stored in the code repository under the corresponding class (step 34). In particular, in the exemplary embodiment of FIG. 2, the actual code snippet will be stored as a leaf node of the level-2 node, which corresponds to the code score of the new snippet, having a parent level-1 node that corresponds to the code pattern class of the code snippet.

If a given code snippet does not fall within an existing class (negative determination in step 32), one optional step is to create a new class for the given code snippet (step 35). For instance, if a new code snippet does not match to a code pattern template according to a predefined minimal degree of similarity, a new class (e.g., level-1 class) can be created through interaction between the system and the user. In particular, the classification system can construct a code pattern model based on, e.g., the actual code snippet and other information input by the user. The tree structure (20) of the code repository can then be updated to include a new level-1 node that represents the code pattern of the new code snippet, as well as a mew corresponding set of level-2 nodes representative of scores. Thereafter, the code snippet can be assigned an initial score (step 33) and then stored in the code repository (step 34) under the newly added level-1 and level-2 nodes.

Figure 4:
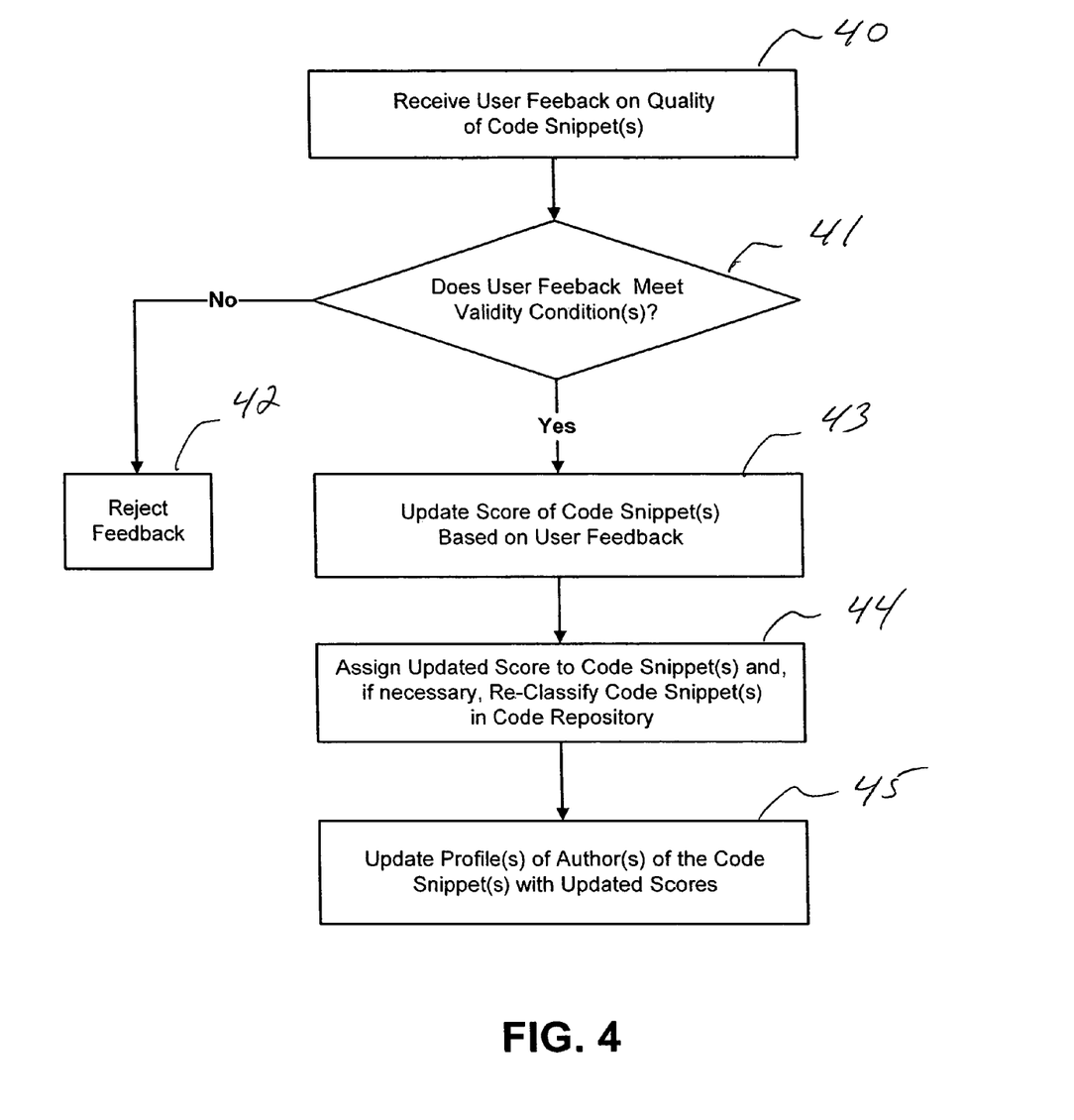
FIG. 4 illustrates a method for rating or scoring the quality of shared code snippets and/or code authors based on multi-user feedback from a community of code authors.

FIG. 4 is a flow diagram that illustrates a method for updating code scores and user scores using multi-user feedback according to an exemplary embodiment of the invention. In one exemplary embodiment of the invention, FIG. 4 illustrates an exemplary mode of operation of the rating system (13) (FIG. 1). As noted above, the code snippets stored in the repository (14) can be accessed and used by the community of users (11). Based on the user's perception of the quality of the code snippets, the user can access the rating system (13) and provide feedback with respect the quality of such code snippets. The system will receive feedback from the user regarding the quality of the code snippet (step 40). In one exemplary embodiment of the invention, a user provides feedback about other code authors and their code by increasing or decreasing the code score of a selected author after using his/her code. The system will update code scores of the code snippets based on feedback received from one or more users.

Before such feedback is considered, the system will determine whether the user's feedback meets one or more validity constraints (step 41). For instance, one constraint can be that a user can not award (or deduct) points to a code snippet that was authored by the user. Another constraint may be that user can award (or deduct) points to a given code snippet one time only. Moreover, a constraint can be applied to limit the amount of points that a user can award or deduct (delta score) to/from a given code score. For instance, a condition may exist such that a user can award no more than 10 points to a current code score or deduct no more than 10 points from a current code score (i.e., $-10<$delta Score$<10$). Any delta score awarded (or deducted) could be contested and subjected to a vote for approval by the system users.

If the user feedback does not comply with such constraint(s) (negative determination in step 41), the system will reject the user feedback (step 42). On the other hand, if the user feedback complies with the constraint(s) (affirmative determination in step 41), the system will update the code score accordingly (step 43). For example, a code score can be updated as $S_{New}=S_{Old}+S_\Delta$, wherein $S_{New}$ denotes the new (updated) code score, $S_{Old}$ denotes the current code score, and wherein $S_A$ denotes the delta Score, which is a positive score awarded or negative score deducted by the user.

After computing the new code score, the system can update the code classification in the code repository (14) by assigning the new score value to the stored code snippet and reclassifying the code snippet, if necessary (step 44). For example, if the new code score of the snippet falls outside the range of score associated with the current level-2 class of the code snippet, the code snippet will be added as a leaf node (23) for the level-2 node corresponding to the new code score.

In another exemplary embodiment of the invention, as an optional step, when the code score of a given code snippet is updated based on user feedback (step 43), the system can automatically updated the current user score(s) of the author(s) of such given code snippet can be updated according to the updated code score. For instance, if the code score of a given code snippet is increased by 5 points, the system can update the user score of the author of such code snippet by 5 points.

In another exemplary embodiment of the invention, a currently assigned user score of a given code developer can be updated/modified based on feedback received by other code developers, using a process similar to the method steps 40–43. For example, in one exemplary embodiment of the invention, one code developer can provide feedback about another code developer by increasing or decreasing the user score of the code developer. Again, before such feedback is considered, the system will determine whether the user's feedback meets one or more validity constraints.

For instance, one constraint can be that a user can not award (or deduct) points to his/her own user score. Another constraint may be that user can award (or deduct) points to a user score one time only. Moreover, a constraint can be applied to limit the amount of points that a user can award or deduct (delta score) from a given user score. For instance, a condition may exist such that a user can award no more than 10 points to a current score or deduct no more than 10 points from a current score (i.e., −10<delta Score<10). Any delta score awarded (or deducted) could be contested and subjected to a vote for approval by the system users. If the user feedback complies with the constraint(s), the system will update the user score accordingly. For example, a user score can be updated as $N_{P\,New}=N_{P\,Old}+N_{P\,A}$, wherein $N_{P\,New}$ denotes the new (updated) user score, $N_{P\,Old}$ denotes the current user score, and wherein $N_{P\,A}$ denotes the delta Score, which is a positive score awarded or negative score deducted by the user.

Figure 5:
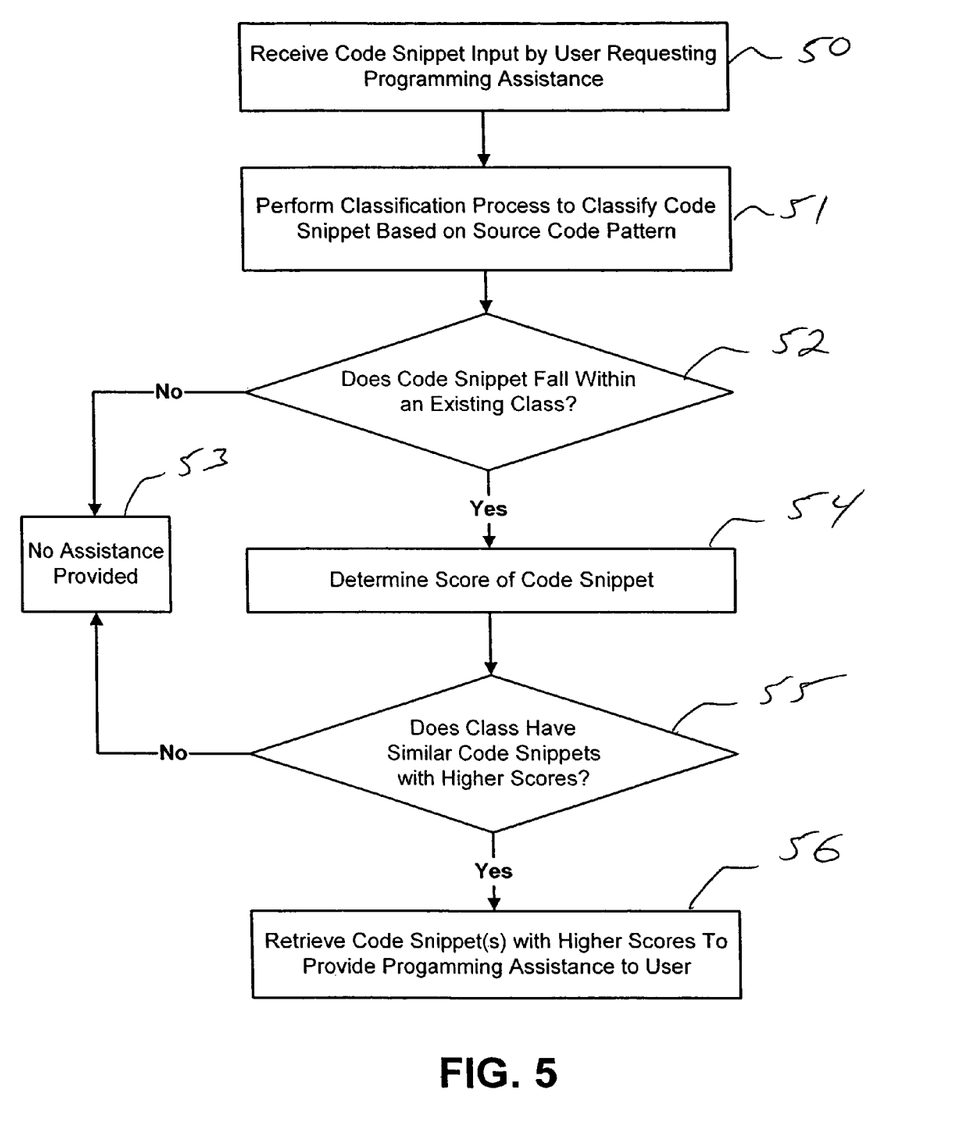
FIG. 5 illustrates a method for providing automated programming assistance using classified code snippets maintained in a code repository according to an exemplary embodiment of the invention.

FIG. 5 illustrates a method for providing automated programming assistance according to an exemplary embodiment of the invention. In one exemplary embodiment of the invention, FIG. 5 illustrates an exemplary mode of operation of the programming assistance engine (16) using classified code snippets maintained in the code repository (14) to provide automated assistance to a user that is writing new code.

Referring to FIG. 5, initially, the system can receive as input a newly authored code snippet by a user and process the code snippet upon request by the user to provide programming assistance (step 50). A classification process is performed to automatically classify the new code snippet based on the source code pattern (step 51). This process can be implemented using the methods discussed above with reference to step 31 of FIG. 3. For example, the new code snippet pattern can be compared against the predefined set of code patterns/templates (or code pattern models) to find a similar code pattern (corresponding to a level-1 class).

If the newly authored code snippet is determined to not fall within an existing class (negative determination in step 52), the user will be prompted accordingly that no programming assistance will be provided (step 53). On the other hand, if the newly authored code snippet is determined to fall within an existing class (affirmative determination in step 52), a code score will be assigned to the newly authored code snippet (step 53). In one exemplary embodiment, the code score of the newly authored code snippet is set to the user's current user score as maintained in the user profile repository (12). The code score of the newly authored code snippet is used to determine the level-2 class to which the newly authored code snippet belongs.

Once the newly authored code snippet is appropriately classified based on its code pattern and code score, the system will determine whether there are similarly classified code snippets in the code repository which have higher code scores (step 55). More specifically, in one exemplary embodiment of the invention, the system can determine if similar code snippets with higher scores exist within the same level-2 class (node) to which the new code snippet belong and/or within one or more level-2 classes of the parent node (level-1 node).

If similar code snippets with higher scores exist (affirmative determination in step 55), then the system can retrieve one or more higher score code snippets and present them to the user as proposed alternative code snippets that can be utilized instead of the newly authored code snippet (step 56). In other exemplary embodiments, the system can return a list of relevant code snippets with links to access such code snippets from other locations. In other exemplary embodiments, the system can present a user interface that allows the user to browse through for code snippets.

In the circumstance where the system does not find similarly classified code snippets with higher scores (negative results in step 55), the system will prompt the user that no alternative code snippets with higher scores exist and thus, no programming assistance is provided (step 56).

It is to be understood that the method of FIG. 5 is merely exemplary, and other methods for providing automated programming assistance can be implemented by leveraging a database or library of shared, reusable code snippets which are classified based on input from multiple code developers within a community of developers. For instance, automated programming assistance can be provided to fix code practice violations, fix code errors, warning, and compilation errors, identify better alternatives for a given code in terms of performance and code elegance, provide assistance to a beginner programmer to learn from more experienced users, find bugs, fix patches, useful comments and guidance to solve particular coding problems, etc.

Moreover, the concepts of the invention can be applied in other domains such as text analytics and spell checkers, for instance. For example, code errors would be replaced by spelling problems, IDEs by word editors, and coding by writing English text.

Although exemplary embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A non-transitory computer readable storage medium embodying instructions executable by a processor to perform method steps for supporting multi-user collaborative program development, the method steps comprising:

inputting a code snippet, wherein the code snippet is software program source code;

automatically classifying the code snippet in at least one of a plurality of predefined classes by comparing the code snippet with code pattern templates of the plurality of predefined classes;

automatically assigning a quality score to the code snippet according to an authoring developer of the code snippet;

storing the classified and scored code snippet in a code repository, wherein the code repository maintains a plurality of classified code snippets of software program source code that are shared, wherein the classified code snippets are organized in the code repository using a multi-level class hierarchy structure; and providing automated programming assistance by searching the code repository for one or more code snippets in the code repository having the same class of the code snippet and having a quality score greater than the quality score assigned to the code snippet, wherein the one or more code snippets are output in response to the input code snippet.

2. A non-transitory computer readable storage medium embodying instructions executable by a processor to perform method steps for providing automated programming assistance for proposing alternative code snippets, the method comprising:

maintaining a code repository of code snippets, wherein the code snippets are software program source code;

receiving quality scores corresponding to the code snippets;

providing automated programming assistance by utilizing the code snippets and associated quality scores, wherein providing automated programming assistance comprises, processing program code input to identify a code pattern, wherein the input program code is a code snippet of software program source code; and retrieving from the code repository at least one different code snippet for replacing the code input, the at least one different code snippet having a code pattern that is similar to an identified code pattern of the input program code and having a higher quality score.

3. The non-transitory computer readable storage medium of claim 2, wherein providing automated programming assistance comprises:

processing a query for programming assistance received from a developer; and automatically searching the code repository for one or more code snippets, based on search parameters specified by the query.

4. The non-transitory computer readable storage medium of claim 3, wherein searching comprises searching for one or more code snippets of a certain type and quality as specified by the query.

5. The non-transitory computer readable storage medium of claim 2, wherein processing the program code comprises using one or more predetermined code pattern templates to identify a code pattern in the input program code that matches to a code pattern template.

6. The non-transitory computer readable storage medium of claim 2, further comprising assigning a quality score to an identified code pattern.

7. The non-transitory computer readable storage medium of claim 6, wherein assigning the quality score to the identified code pattern comprises determining the quality score based on persistently stored user profile information associated with an author of the input program code.

8. The non-transitory computer readable storage medium of claim 2, wherein the quality score of a given code snippet is derived from user profile information associated with developers of the given code snippet.

9. The non-transitory computer readable storage medium of claim 2, wherein the quality score of a given code snippet is derived, in part, from feedback rating information provided by one or more of the developers.

10. A method for supporting multi-user collaborative program development, the method comprising:

obtaining a code snippet, wherein the code snippet is software program source code;

classifying, automatically, by a processor, the code snippet;

storing the classified code snippet in a code repository, wherein the code repository maintains a plurality of classified code snippets of software program source code that are shared among the developers; and providing automated programming assistance by the processor, wherein the automated programming assistance includes one or more classified code snippets in the code repository, wherein providing automated programming assistance comprises, processing the code snippet to identify a code pattern and a quality score; and retrieving from the code repository, at least one different code snippet having a similar code pattern and a higher quality score than the code snippet.

11. The method of claim 10, wherein obtaining a code snippet comprises automatically extracting one or more code snippets from program code.

12. The method of claim 11, wherein automatically extracting comprises comparing a predetermined code pattern template against the program code to identify a code pattern in the program code which matches to the code pattern template.

13. The method of claim 10, wherein automatically classifying comprises classifying the code snippet in at least one of a plurality of predefined classes.

14. The method of claim 12, wherein the plurality of predefined classes include a code pattern type and a quality score.

15. The method of claim 13, comprising creating a new class for the code snippet if the code snippet can not be classified in at least one of the plurality of predefined classes.

16. The method of claim 10, wherein classifying comprises:

determining a code pattern of the code snippet; and determining a quality score of the code snippet; wherein the code snippet is classified according to the code pattern and quality score of the code snippet.

17. The method of claim 16, wherein determining a code pattern comprises comparing the code snippet to each of a plurality of code pattern templates, wherein the code snippet is classified based on a class associated with a matching code pattern template.

18. The method of claim 16, wherein the quality score of the code snippet is determined, at least in part, by a quantitative measure of a level of experience and skill of s developer who authored the code snippet.

19. The method of claim 10, wherein storing the code snippet in the code repository comprises organizing the code snippets in the code repository using a multi-level class hierarchy structure.

20. The method of claim 10, further comprising maintaining user profile information for each developer.

21. The method of claim 20, further comprising using the user profile information to classify code snippets stored in the code repository.

22. The method of claim 20, wherein the user profile information of a given developer is used to determine a user score associated with the developer, wherein the user score is a quantitative measure of a level of skill and experience of the developer, wherein quality scores of code snippets are based on user scores of developers who authored the code snippets.

23. The method of claim 10, further comprising reclassifying a code snippet in the code repository based on feedback received by a developer.

24. The method of claim 23, wherein the feedback comprises a quality rating of a code snippet used by the developer.

25. The method of claim 23, wherein the feedback comprises an increase or decrease of the quality score of a code snippet used by a developer.

26. The method of claim 25, further comprising limiting an amount of increase or decrease of the quality score by the developer.

27. The method of claim 23, wherein the feedback comprises an experience and skill rating of a code developer who authored the code snippet.

28. The method of claim 23, further comprising enforcing at least one condition for reclassifying the code snippet based on feedback from a developer.

29. The method of claim 28, wherein the at least one condition is that a developer can not provide feedback regarding a code snippet authored by the developer.

30. The method of claim 28, wherein the at least one condition is that a developer can not provide feedback for a given code snippet more than a predetermined number of times.

31. The method of claim 28, wherein the at least one condition is that feedback from a developer must be approved by one or more other developers in the collaborative program development environment.

32. The method of claim 10, wherein providing automated programming assistance comprises searching the code repository for one or more code snippets of a certain class as specified by the query.

* * * * *